United States Patent
Young et al.

(10) Patent No.: US 12,267,205 B2
(45) Date of Patent: Apr. 1, 2025

(54) SYSTEMS AND METHODS FOR AUTOMATING NETWORK SLICE CONFIGURATION

(71) Applicant: Verizon Patent and Licensing Inc., Basking Ridge, NJ (US)

(72) Inventors: Kristen Sydney Young, Mine Hill, NJ (US); Viswanath Kumar Skand Priya, Irving, TX (US); Ravi Potluri, Coppell, TX (US); Jason T. Wright, Novi, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 377 days.

(21) Appl. No.: 17/649,093

(22) Filed: Jan. 27, 2022

(65) Prior Publication Data
US 2023/0239201 A1   Jul. 27, 2023

(51) Int. Cl.
*H04L 41/0806* (2022.01)
*H04L 41/0893* (2022.01)
*H04L 41/5022* (2022.01)

(52) U.S. Cl.
CPC ...... *H04L 41/0806* (2013.01); *H04L 41/0893* (2013.01); *H04L 41/5022* (2013.01)

(58) Field of Classification Search
CPC . H04L 41/0806; H04L 41/40; H04L 41/0853; H04L 47/22; H04W 92/02; H04W 88/16; H04W 84/042; H04W 84/10
See application file for complete search history.

(56) References Cited

U.S. PATENT DOCUMENTS

| | | | | |
|---|---|---|---|---|
| 2018/0091999 | A1* | 3/2018 | Zhang | H04L 47/12 |
| 2018/0139106 | A1* | 5/2018 | Senarath | H04L 67/51 |
| 2018/0302877 | A1* | 10/2018 | Bosch | H04W 68/02 |
| 2020/0367109 | A1* | 11/2020 | Chen | H04W 28/18 |
| 2021/0021494 | A1* | 1/2021 | Yao | H04L 41/0631 |
| 2021/0083933 | A1* | 3/2021 | Bull | H04L 47/24 |
| 2022/0116445 | A1* | 4/2022 | Filippou | H04L 41/0853 |

(Continued)

OTHER PUBLICATIONS

3GPP TS 23.501, V16.9.0, 3rd Generation Partnership Project; Technical Specification Group Services and System Aspects; System architecture for the 5G System (5GS); Stage 2 (Release 16), Jun. 2021, 452 pages.

(Continued)

*Primary Examiner* — Mahran Y Abu Roumi

(57) ABSTRACT

In some implementations, a first device may receive, from a second device, network function (NF) configuration information indicating that an NF instance is to be provisioned to support a combination of network slices. The NF configuration information may include first network slice information regarding the first network slice and second network slice information regarding the second network slice. The first device may obtain, from a data structure, first slice configuration information associated with the NF instance supporting the first network slice and second slice configuration information associated with the NF instance supporting the second network slice. The first device may generate configuration parameters to provision the NF instance to support the combination of network slices and provide the configuration parameters to cause the NF instance to be provisioned to support the combination of network slices.

20 Claims, 8 Drawing Sheets

(56) References Cited

U.S. PATENT DOCUMENTS

| | | | |
|---|---|---|---|
| 2022/0138081 A1* | 5/2022 | Varma | G06F 11/3684 |
| | | | 717/124 |
| 2022/0191303 A1* | 6/2022 | Gupta | H04L 47/823 |
| 2022/0337991 A1* | 10/2022 | Kienig | H04W 60/04 |
| 2024/0080759 A1* | 3/2024 | Gupta | H04W 28/0268 |

OTHER PUBLICATIONS

3GPP TS 23.558, V17.0.0, 3rd Generation Partnership Project; Technical Specification Group Services and System Aspects; Architecture for enabling Edge Applications; (Release 17), Jun. 2021, 157 pages.

"ONAP Architecture Overview," Open Network Automation Platform (ONAP), The Linux Foundation Projects, 19 pages [Retrieved on Dec. 14, 2021 from https://www.onap.org/wp-content/uploads/sites/20/2019/07/ONAP_CaseSolution_Architecture_062519.pdf].

* cited by examiner

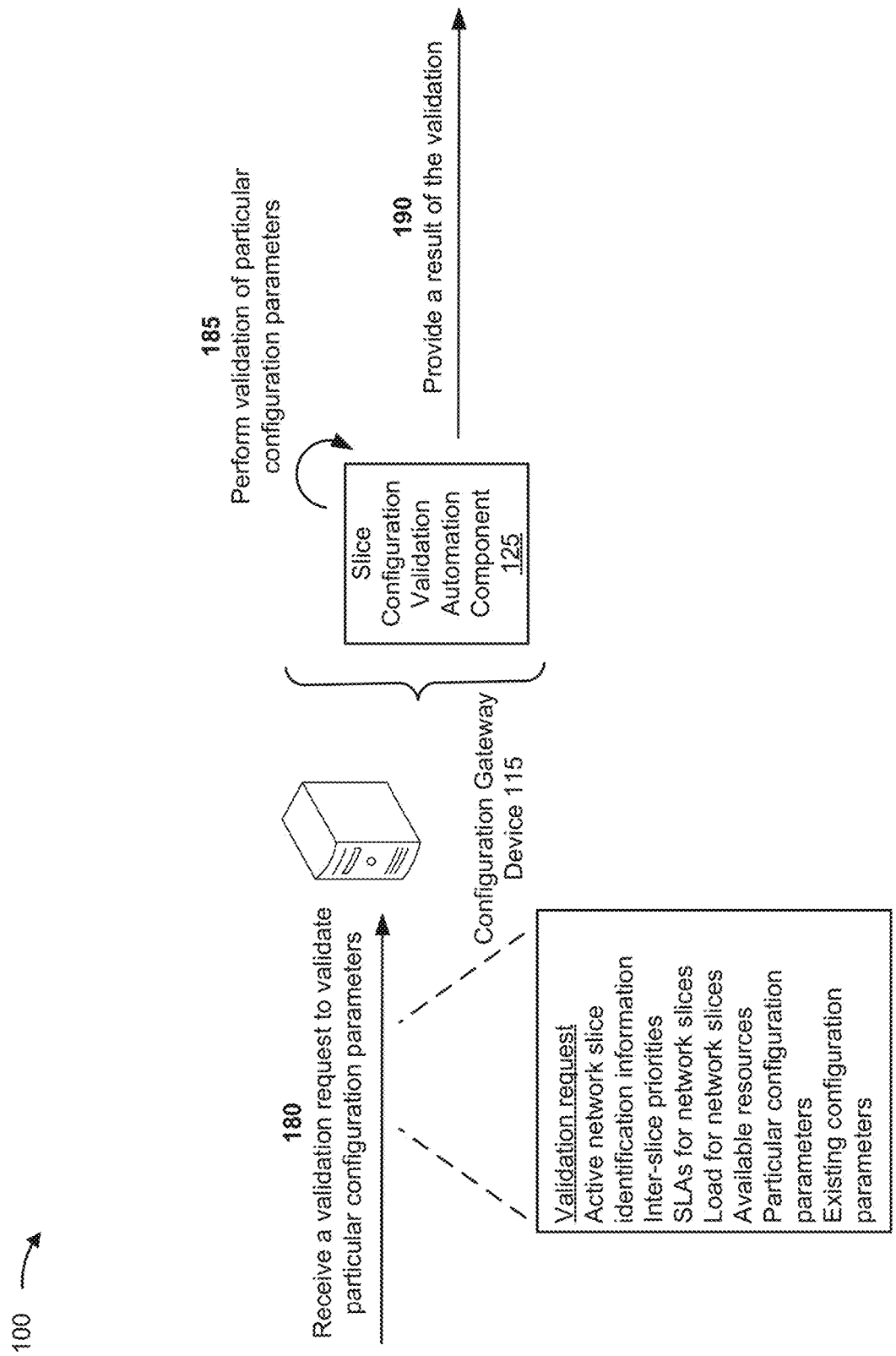

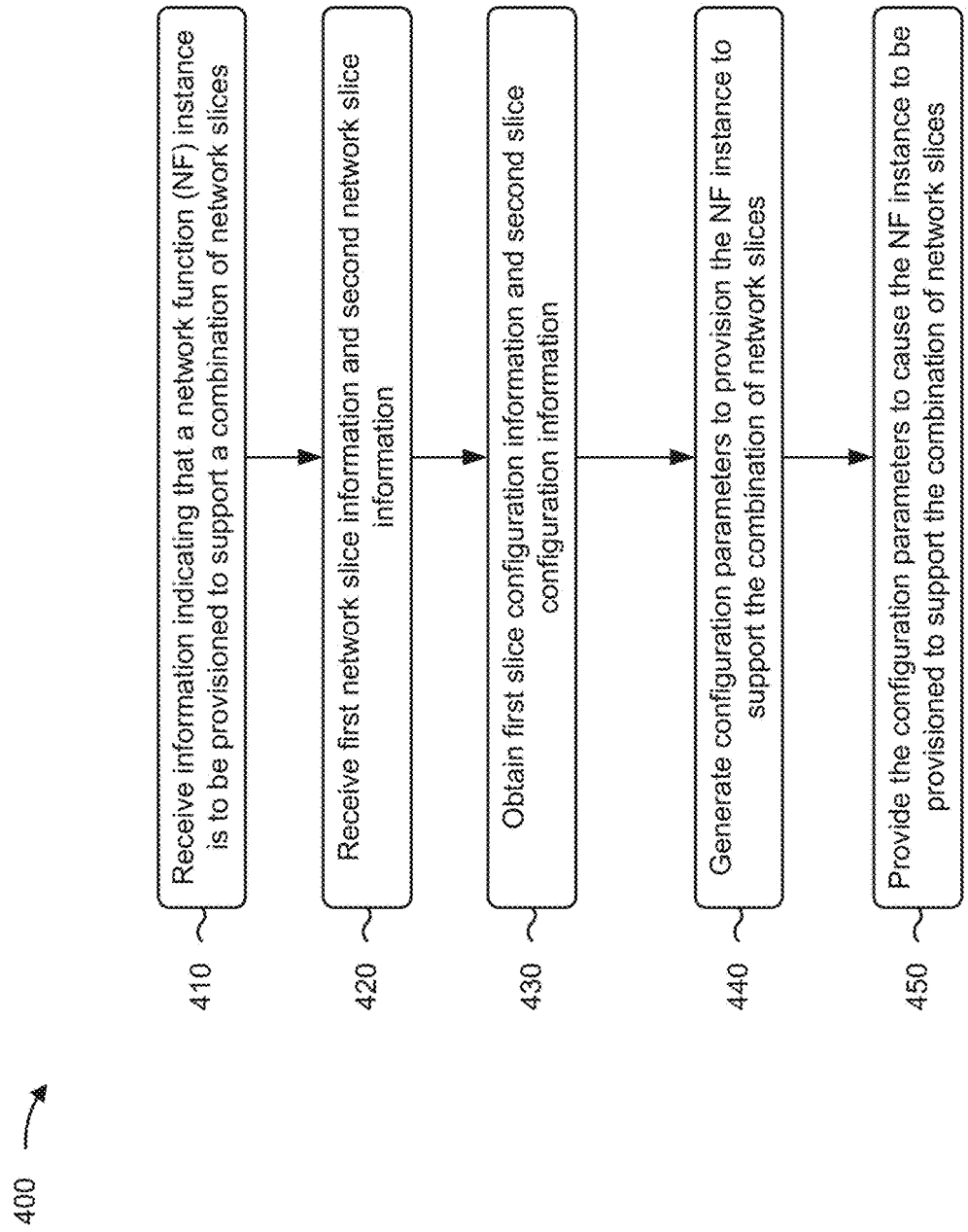

SYSTEMS AND METHODS FOR AUTOMATING NETWORK SLICE CONFIGURATION

BACKGROUND

Fifth Generation/New Radio (5G/NR) provides various enhancements to wireless communications, such as flexible bandwidth allocation, improved spectral efficiency, ultra-reliable low-latency communications (URLLC), beamforming, high-frequency (e.g., millimeter wave (mmWave)) communication, and/or other enhancements.

BRIEF DESCRIPTION OF THE DRAWINGS

FIGS. 1A-1E are diagrams of an example associated with automating network slice configuration.

FIG. 4 is a flowchart of an example process associated with automating network slice configuration.

DETAILED DESCRIPTION OF PREFERRED EMBODIMENTS

Figure 1A:
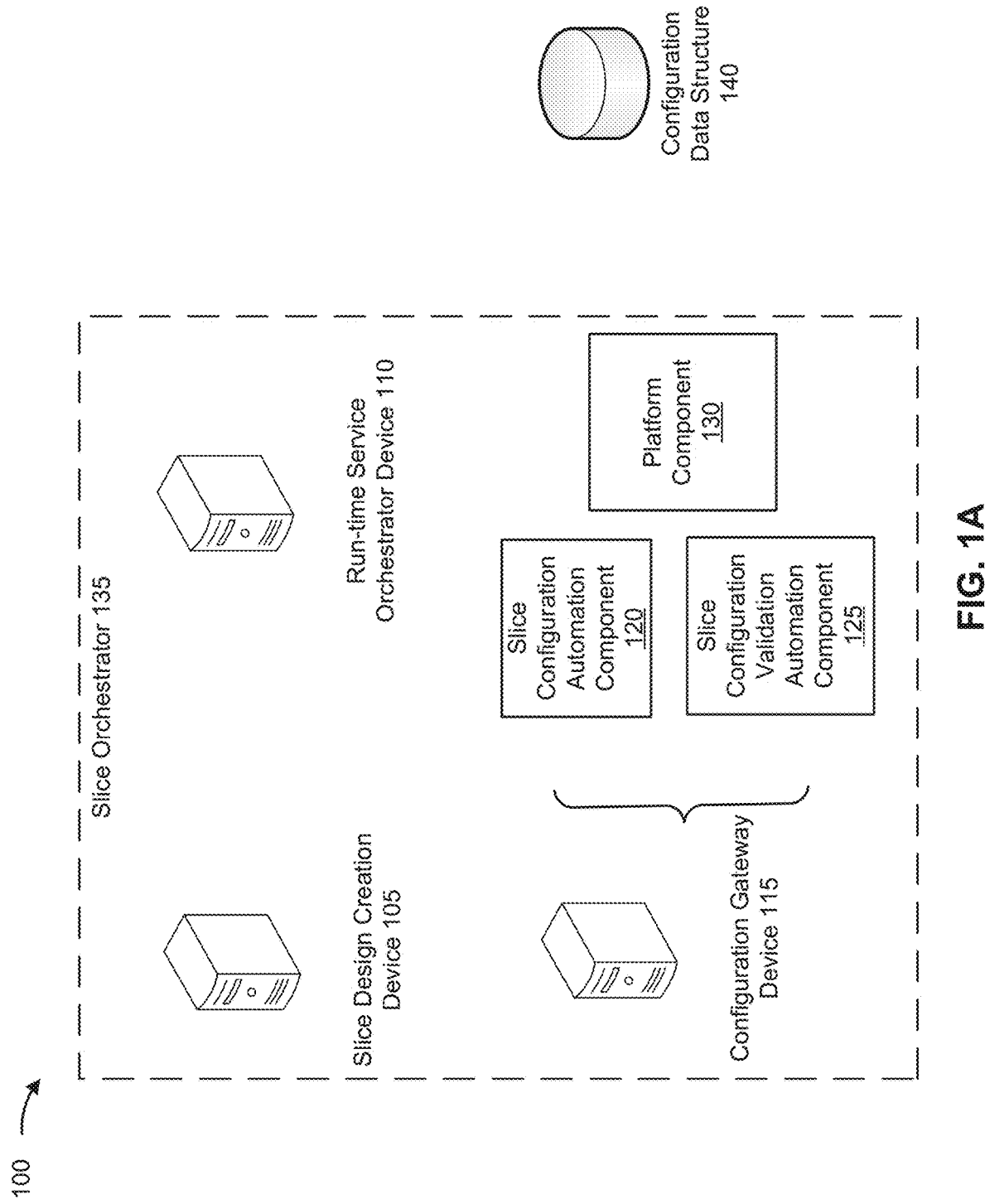

The following detailed description of example implementations refers to the accompanying drawings. The same reference numbers in different drawings may identify the same or similar elements.

5G/NR network slice activation is a stage of a life cycle of a network slice. 5G/NR network slice activation involves a creation and a provisioning of a network function (NF) instance to support the network slice. The NF instance may include a distributed unit (DU) instance, a central unit (CU) instance, a remote unit (RU) instance, among other examples. The provisioning of the NF instance involves determining configuration parameters that indicate a manner in which the NF instance utilizes resources, associated with the NF instance, to support the network slice.

Typically, the NF instance may support multiple network slices. In this regard, the NF instance may support numerous combinations of network slices. An exact combination of network slices (to be supported by the NF instance) cannot be known prior to provisioning the NF instance, due to the dynamic nature of network slices. Accordingly, the configuration parameters, for the numerous combinations of network slices, must be determined manually using computing devices. Determining the configuration parameters in this manner is cumbersome, time consuming, and wastes computing resources, network resources, and other resources.

Implementations described herein are directed to automating a process for network slice configuration. For example, a network device may dynamically determine configuration parameters for an NF instance that is to support a combination of network slices (e.g., a known combination of network slices) that are to be active, out of numerous combinations of network slices. The configuration parameters may include information identifying a manner in which resources, associated with the NF instance, are to be used to meet requirements associated with the combination of network slices. As an example, the configuration parameters may include information identifying a manner in which physical resource blocks (PRBs) are to be shared between the network slices of the combination of network slices.

The configuration parameters may include configuration parameter keys and configuration parameter values associated with the configuration parameter keys. As an example, a configuration parameter key may identify a portion of resources (e.g., a percentage of resources) to be allocated to support a network slice. A configuration parameter value may identify a value of the portion of resource. In this regard, the network device may be configured to determine optimized configuration parameter values, for the configuration parameter keys, to enable the NF instance to efficiently support the combination of network instances.

In some instances, the network device may receive information that is used to determine the configuration parameters. The information may include available resource information regarding available resources associated with the NF instance, information identifying a subset of a plurality of configuration parameters associated with the NF instance, service level agreement information associated with the network slices, priority information identifying inter-slice priority levels associated with the network slices, and information identifying the network slices as active network slices.

The network device may determine (e.g., update) the configuration parameters as a network slice is added to and/or removed from the combination of network slices. By determining the configuration parameters as described herein, the network device may preserve computing resources, network resources, and other resources that would have been consumed by manually determining the configuration parameters for the numerous combinations of network slices.

In some situations, configuration parameters may be manually modified or created. For example, a configuration parameter value (associated with a configuration parameter key of the configuration parameters) may be manually modified. Alternatively, an additional configuration parameter key and a corresponding configuration parameter value may be created in addition to the configuration parameters. Accordingly, in such instances, the network device may perform a validation, based on the configuration parameters (manually modified or created), to determine whether the NF instance is able to continue to support the combination of network slices that are active. For example, the network device may perform the validation to determine whether requirements associated with the combination of network slices can continue to be satisfied. The requirements may include jitter requirements, latency requirements, throughput requirements, among other examples.

FIGS. 1A-1E are diagrams of an example 100 associated with automating network slice configuration. As shown in FIG. 1A, example 100 includes a slice design creation device 105, a run-time service orchestrator device 110, and a configuration gateway device 115. Slice design creation device 105 may include one or more devices capable of receiving, generating, storing, processing, and/or providing information associated with automating network slice configuration, as described elsewhere herein. For example, slice design creation device 105 may provide information (regarding network slices) that may be used to generate configuration parameters, as explained in more detail below.

Run-time service orchestrator device 110 may include one or more devices capable of receiving, generating, storing, processing, and/or providing information associated with automating network slice configuration, as described elsewhere herein. Run-time service orchestrator device 110 may be configured to perform network slice management functions (NSMFs). For example, run-time service orchestrator device 110 may receive the information from slice design creation device 105 and may provide the information to configuration gateway device 115 to cause configuration gateway device 115 to generate configuration parameters, as described in more detail below. In some examples, run-time service orchestrator device 110 may provide the information to configuration gateway device 115 based on receiving a request to deploy network slices. The information may be provided to configuration gateway device 115 to cause configuration gateway device 115 to automate generating the configuration parameters.

Configuration gateway device 115 may include one or more devices capable of receiving, generating, storing, processing, and/or providing information associated with automating network slice configuration and automating validation of configuration parameters, as described elsewhere herein. For example, configuration gateway device 115 may perform tasks associated with configuring NF instances to support network slices, as described in more detail below.

As shown in FIG. 1A, configuration gateway device 115 may include a slice configuration automation component 120, a slice configuration validation automation component 125, and a platform component 130. Slice configuration automation component 120 may be configured to generate configuration parameters to provision NF instances to support one or more network slices, as described in more detail below. Slice configuration validation automation component 125 may be configured to perform validation of configuration parameters that have been manually modified or created, as described in more detail below.

Slice configuration validation automation component 125 may be configured to perform the validation to determine whether network slices can continue to be supported after the configuration parameters have been manually modified or created. Platform component 130 may be configured to obtain information from a data structure that may be used to generate the configuration parameters, as described in more detail below.

In some implementations, slice design creation device 105, run-time service orchestrator device 110, and configuration gateway device 115 may be part of a slice orchestrator 135. In some examples, slice orchestrator 135 may be associated with a wireless telecommunications system (referred to herein as a "wireless network"). As an example, the wireless network may be a 5G wireless telecommunications system.

As shown in FIG. 1A, example 100 may further include a configuration data structure 140. Configuration data structure 140 may include a data structure (e.g., a database, a table, and/or a linked list) that stores information for provisioning NF instances to support network slices (e.g., information that may be used to generate the configuration parameters).

In the example that follows, configuration parameters are to be generated to provision an NF instance to support a combination of network slices. The network slices may include a first network slice and a second network slice. The quantity of network slices is merely provided as an example. In practice, different quantities of network slices may be used in different situations.

Figure 1B:
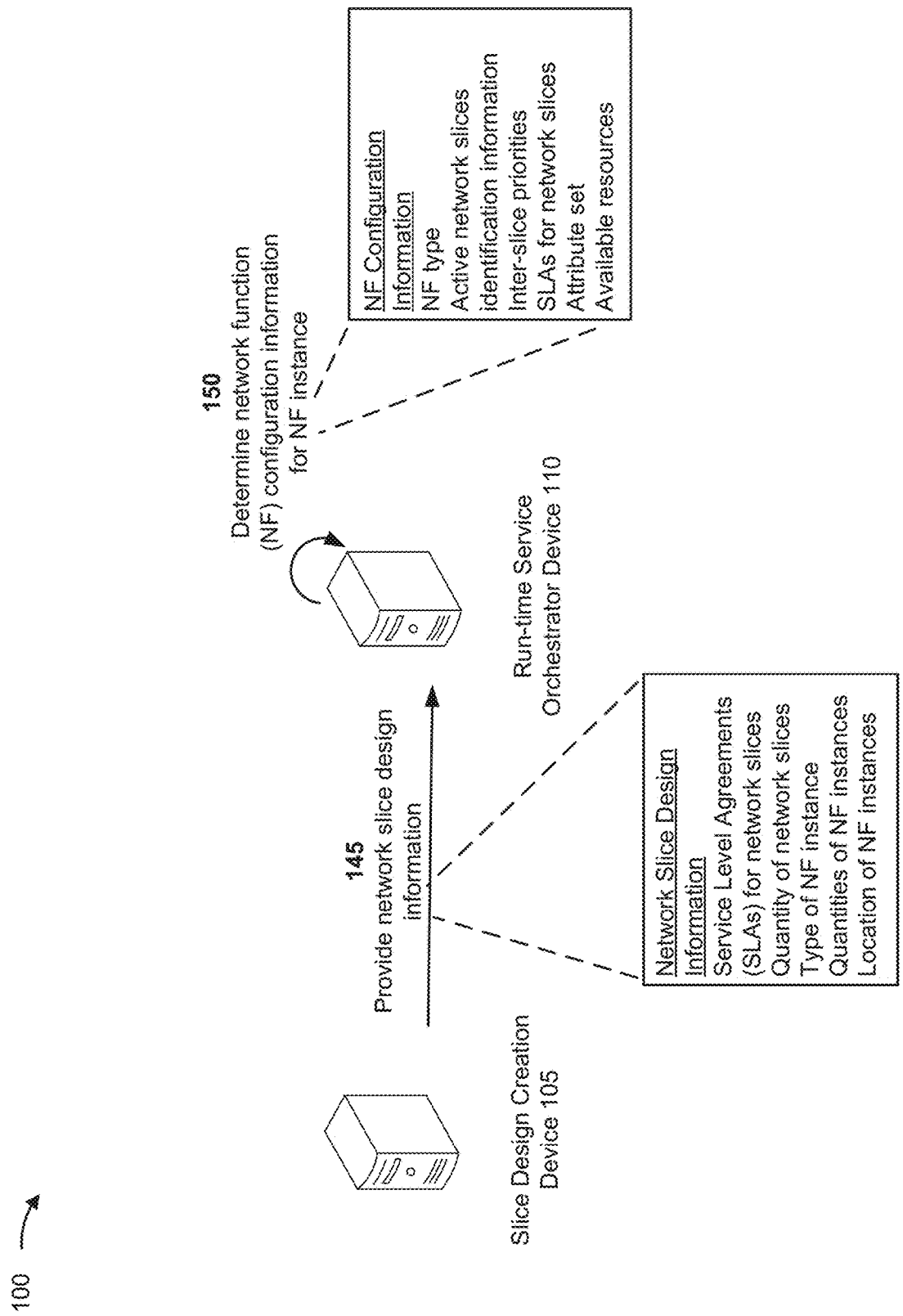

As shown in FIG. 1B, and by reference number 145, slice design creation device 105 may provide network slice design information. For example, slice design creation device 105 may provide the network slice design information to run-time service orchestrator device 110. In some implementations, slice design creation device 105 may receive an indication that the NF instance is to support the combination of network slices and may provide the network slice design information to run-time service orchestrator device 110 based on receiving the indication. In some examples, the network slice design information may be received from a device of a network administrator (e.g., a slice designer). Alternatively, the network slice design information may be derived from a slice profile that is based on standards regarding network slices (e.g., 3rd Generation Partnership Project (3GPP) service/slice profile).

In some examples, the network slice design information may include information identifying a quantity of network slices to be supported, first service level agreement information associated with the first network slice, second service level agreement information associated with the second network slice, information identifying a type of the NF instance to support the network slices, information identifying a quantity of NF instances to support the network slices, information identifying locations of the NF instances, among other examples.

The first service level agreement may include information regarding a latency requirement associated with the first network device, information regarding a jitter requirement associated with the first network device, information regarding a throughput requirement associated with the first network device, information regarding a security requirement associated with the first network device, among other examples. The second service level agreement may include information similar to the information included in the first service level agreement.

The type of NF instance may include information identifying a DU instance, a CU instance, an RU instance, an access and mobility management function (AMF) instance, a user plane function (UPF) instance, among other examples. In some instances, the indication (that the NF instance is to support the combination of network slices) may include the network slice design information.

As shown in FIG. 1B, and by reference number 150, run-time service orchestrator device 110 may determine NF configuration information for the NF instance. For example, slice design creation device 105 may provide the network slice design information to run-time service orchestrator device 110, and run-time service orchestrator device 110 may determine the NF configuration information based on the network slice design information. In some examples, the NF configuration information may include information from the network slice design information. In some instances, a portion of the NF configuration may be received from a device of a network administrator (e.g., slice designer) and/or another device external with respect to slice orchestrator 135.

The NF configuration information may include first network slice information regarding the first network slice and second network slice information regarding the second network slice. The first network slice information may include the first service level agreement information associated with the first network slice, information identifying a priority associated with the first network slice (e.g., an inter-slice priority level associated with the first network slice), and information identifying the first network slice as an active network slice in the combination of network slices.

In some instances, the inter-slice priority level of the first network slice may be determined based on network slice selection assistance information (NSSAI) that identifies the first network slice. The second network slice information may include information similar to information included in the first network slice information.

In some implementations, run-time service orchestrator device 110 may determine the type of NF instance based on the NF configuration. As an example, the type of NF instance may be a radio access network (RAN) NF instance (e.g., a virtual DU instance). The type of NF instance is merely provided as an example. In practice, different types of NF instances may be used in different situations. In some implementations, run-time service orchestrator device 110 may determine whether the NF instance is sufficient to support the combination of network slices or whether one or more additional NF instances are to be provisioned to support the combination of network slices.

In some examples, run-time service orchestrator device 110 may receive information identifying a subset of a plurality of configuration parameters (hereinafter "subset of configuration parameters") associated with the NF instance. The subset of configuration parameters may identify configuration parameter keys for which configuration gateway device 115 is to generate optimized configuration parameter values to enable the NF instance to efficiently support the combination of network instances.

In some examples, the plurality of configuration parameters may include three categories of configuration parameters, such as slice agnostic configuration parameters, common configuration parameters, and dedicated configuration parameters. The slice agnostic configuration parameters may include configuration parameters that are independent of a network slice supported by the NF instance. For example, the slice agnostic configuration parameters may include tracking areas (e.g., for an AMF instance), frequency of carrier (e.g., for a CU instance), among other examples.

The common configuration parameters may include configuration parameters that are shared by multiple network slices. For example, the common configuration parameters may include information indicating a manner in which resources are to be allocated to the network slices (e.g., round robin, strict priority, among other examples). The dedicated configuration parameters may include configuration parameters that are designed specifically for a particular network slice. In this regard, the dedicated configuration parameters may include multiple instances of a configuration parameter, and a quantity of the instances may be based on a quantity of network slices. The subset of configuration parameters may include the common configuration parameters (e.g., include configuration parameter keys of the common configuration parameters).

In some examples, the subset of configuration parameters may be pre-configured (e.g., designed manually by the network administrator). Alternatively, the subset of configuration parameters may be determined by dynamic optimization, as described herein.

In some examples, run-time service orchestrator device 110 may receive available resource information regarding available resources associated with the NF instance. In some examples, the available resource information may include information regarding data radio bearers, information regarding physical resource blocks, information identifying a quantity of data radio bearers, information identifying a quantity of physical resource blocks, and/or information identifying an amount of carrier bandwidth.

In some implementations, run-time service orchestrator device 110 may receive first environment information identifying a first environment associated with the first network slice and second environment information identifying a second environment associated with the second network slice. For example, the first environment may include a rural area and the second environment may include an urban area.

Based on the foregoing, the NF configuration information may include information identifying the type of the NF instance, the first network slice information, the second network slice information, the information identifying the subset of configuration parameters (e.g., configuration parameter keys), the first environment information, and the second environment information. Run-time service orchestrator device 110 may provide the NF configuration information to configuration gateway device 115 to cause configuration gateway device 115 to generate configuration parameter values for the subset of configuration parameters (e.g., generate optimized configuration parameter values for the configuration parameter keys of the common configuration parameters). In some implementations, run-time service orchestrator device 110 may receive a request to deploy the network slices and may provide the NF configuration information based on receiving the request.

Figure 1C:
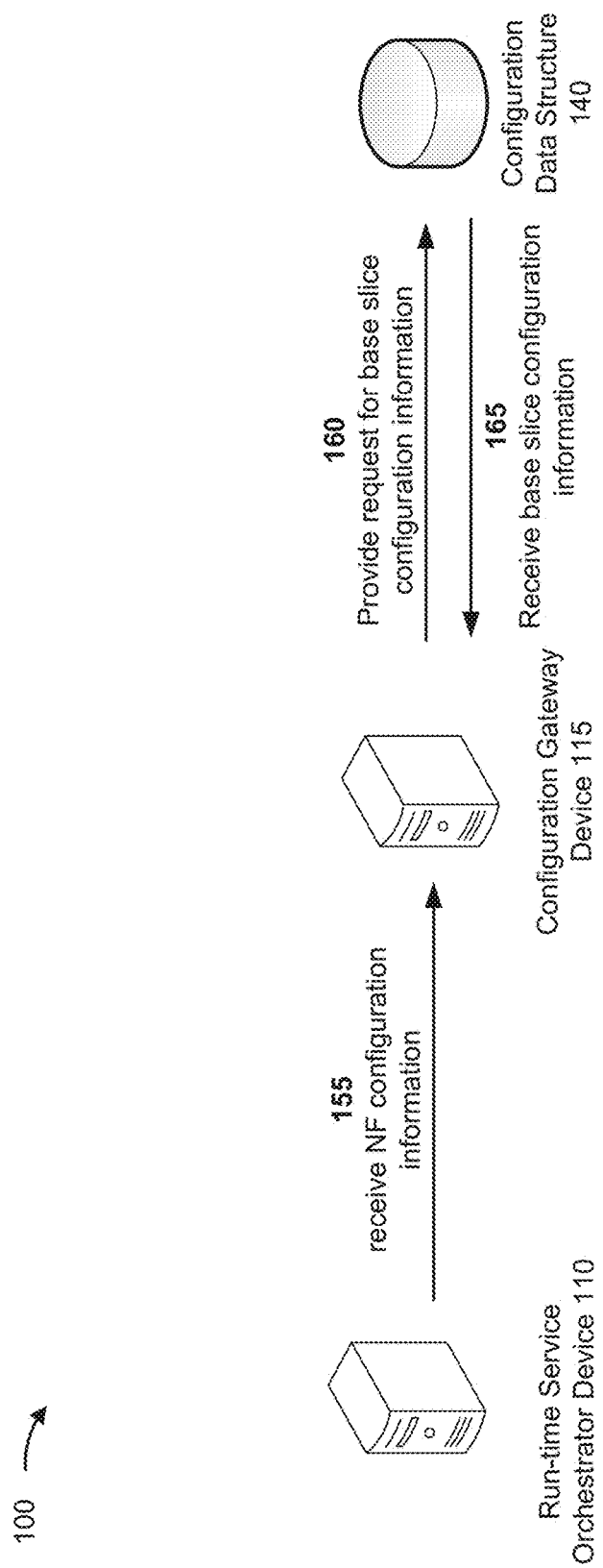

As shown in FIG. 1C, and by reference number 155, configuration gateway device 115 may receive the NF configuration information. For example, configuration gateway device 115 may receive the NF configuration information based on run-time service orchestrator device 110 receiving the request to deploy the network slices.

As shown in FIG. 1C, and by reference number 160, configuration gateway device 115 may provide a request for base slice configuration information. In some implementations, based on receiving the NF configuration information, configuration gateway device 115 may provide a base slice configuration request. The base slice configuration request may be provided via platform component 130. The base slice configuration request may include information identifying the first network slice and information identifying the second network slice, based on the NF configuration information identifying the first network slice and the second network slice.

The base slice configuration information may include information regarding a manually designed configuration for the first network slice and information regarding a manually designed configuration for the second network slice. For example, the base slice configuration information may be manually designed and provided using the device of a network administrator and/or another device external with respect to slice orchestrator 135.

The base slice configuration information may include first slice configuration information associated with the NF instance supporting the first network slice individually (e.g., without supporting the second network slice). The first slice configuration information may include configuration parameters that may be used to provision the NF instance to support the first network slice. The base slice configuration information may further include second slice configuration information associated with the NF instance supporting the second network slice information individually (e.g., without supporting the first network slice). The second slice configuration information may include configuration parameters that may be used to provision the NF instance to support the second network slice.

As an example, the first slice configuration information may include information identifying a first subcarrier spacing associated with the first network slice. The second slice configuration information may include information identifying a second subcarrier spacing associated with the second network slice. In some implementations, the base slice configuration information may provide starting points for optimizing the configuration parameters used to provision the NF instance.

As shown in FIG. 1C, and by reference number 165, configuration gateway device 115 may receive the base slice configuration information. For example, based on providing the slice configuration request, configuration gateway device 115 (e.g., using platform component 130) may receive the base slice configuration information from configuration data structure 140.

Figure 1D:
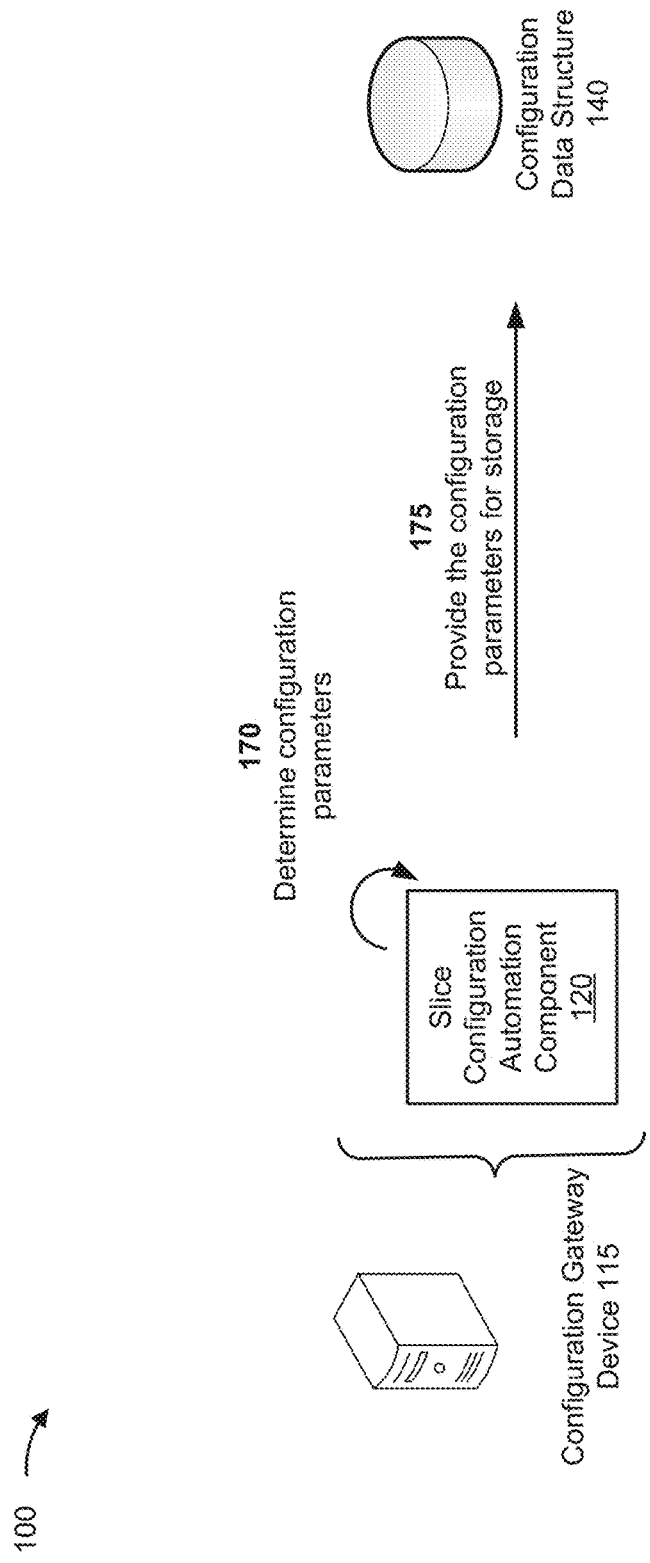

As shown in FIG. 1D, and by reference number 170, configuration gateway device 115 may determine configuration parameters (e.g., optimized configuration parameters). For example, configuration gateway device 115 may determine configuration parameter values (e.g., optimized configuration parameter values) for the configuration parameter keys of the subset of configuration parameters. In some implementations, configuration gateway device 115 may determine the configuration parameter values based on minimum values, maximum values, or an average of values of the configuration parameter values included in the base slice configuration information.

Additionally, or alternatively, configuration gateway device 115 may create a set of configuration parameter keys that are slice specific, and may copy corresponding configuration parameter values from the base slice configuration information. Alternatively, configuration gateway device 115 may use one or more rules to determine configuration parameter values for the set of configuration parameter keys.

Configuration gateway device 115 (e.g., using slice configuration automation component 120) may determine the configuration parameters based on the NF configuration information, the first slice configuration information, and/or the second slice configuration information. Configuration gateway device 115 may determine the configuration parameters to provision the NF instance to support the combination of network slices. In some examples, the configuration parameters may include, for each network slice, a configuration parameter key that identifies a priority of each network slice (e.g., an attribute labeled "priority_slice_1") and a configuration parameter value that indicates a value of priority of each network slice (e.g., a value of "1").

Additionally, or alternatively, the configuration parameters may include a configuration parameter key that identifies a highest priority out of the priorities of the network slices (e.g., an attribute labeled "highest_priority_slice") and a configuration parameter value that indicates a value of the highest priority and identifies a network slice associated with the highest priority (e.g., a value of "network slice 1–priority 1"). Additionally, or alternatively, the configuration parameters may include a configuration parameter key that identifies a quantity of network slices supported by the NF (e.g., an attribute labeled "quantity of network slices") and a configuration parameter value that indicates a value of the quantity of network slices (e.g., a value of "2"). Additionally, or alternatively, the configuration parameters may include a configuration parameter key that identifies a portion of resources allocated to each network slice supported by the NF (e.g., an attribute labeled "resources_portion_slice_1") and a configuration parameter value that indicates a value of the portion of resources (e.g., a value of "55%").

In some implementations, configuration gateway device 115 may determine the configuration parameters based on rules indicating a manner in which the resources are to be allocated between the network slices. The rules may be based on the priorities associated with the network slices, the requirements associated with the network slices, the type of the NF instance, environment information identifying environments associated with the network slices, among other examples.

As an example, the rules may include a first rule that may indicate an allocation of resources when the wireless network is experiencing a congestion, a second rule that may indicate an allocation of resources when the wireless network is experiencing a resource shortage, and so on. For instance, the first rule may indicate that a portion of the resources allocated to a network slice (associated with a first priority that exceeds a second priority) is to exceed a portion of the resources allocated to another network slice associated with the second priority.

The second rule may indicate that a majority, if not all, of resources are to be allocated to a network slice associated with an urban area over another network slice associated with a rural area. The rules discussed above are merely provided as examples. In practice, different rules and/or additional rules may be used in different situations.

In some implementations, the network device may determine the configuration parameters using a machine learning model that is trained to determine configuration parameters (e.g., determine optimized configuration parameter values) that may be used to provision NF instances. The machine learning model may be trained as described in more detail below in connection with FIG. 2. In some examples, configuration gateway device 115 may train the machine learning model. Additionally, or alternatively, a different device may generate and train the machine learning model.

The machine learning model may be trained based on historical data that includes data regarding different types of historical NF instances, data regarding priorities of historical network slices, data regarding historical requirements associated with the historical network slices, data regarding historical quantities of the historical network slices that are supported by the historical NF instances, data regarding historical resources, data regarding historical allocation of resources between the historical network slices, data regarding historical environments associated with the network slices, among other examples.

In some instances, configuration gateway device 115 may determine the configuration parameters based on the NF configuration information (e.g., without the first slice configuration information and the second slice configuration information). In some implementations, configuration gateway device 115 may redetermine (e.g., update) the configuration parameters as a network slice is added to and/or removed from the combination of network slices. For example, configuration gateway device 115 may receive an indication that a network slice is added to and/or removed from the combination of network slices.

The indication may be received from run-time service orchestrator device 110, from the device of the network administrator, among other examples. Based on the indication, configuration gateway device 115 may redetermine configuration parameter values for the configuration parameter keys in a manner similar to the manner described above. In some implementations, configuration gateway device 115 may determine a plurality of sets of configuration parameters to provision the NF instance to support the different combinations of network slices. With respect to removing a network slice (e.g., slice termination), generating slice configuration information for network slices and provisioning of the network slices will work according to a life cycle management (LCM) action. For example, if the second network slice is created on top of the first network slice, then the generated configuration information (e.g., the second slice configuration information) will contain the configuration parameters for the first network slice and the second network slice. If the second network slice is terminated, either the configuration parameters of the second network slice are removed as part of provisioning action or the new generated configuration information will now include only the first network slice and configuration gateway device 115 may simply execute new generated first slice configuration information, thereby auto-removing the second network slice.

As shown in FIG. 1D, and by reference number 175, configuration gateway device 115 may provide the configuration parameters for storage. For example, after determining the configuration parameters, configuration gateway device 115 may provide the configuration parameters to configuration data structure 140 for storage. The configuration parameters may include the configuration parameter values (e.g., the optimized configuration parameter values) and the configuration parameter keys. The configuration parameters may be stored with information identifying the combination of network slices.

In some implementations, after providing the configuration parameters for storage, configuration gateway device 115 may receive an indication that the NF instance is to be provisioned. The indication may be received from run-time service orchestrator device 110, from the device of the network administrator, among other examples. Based on the indication, configuration gateway device 115 may obtain the configuration parameters from configuration data structure 140. For example, configuration gateway device 115 (e.g., using platform component 130) may provide a request that includes the information identifying the combination of network slices. Configuration gateway device 115 (e.g., using platform component 130) may obtain the configuration parameters from configuration data structure 140 based on the request and may provide the configuration parameters to cause the NF instance to be provisioned to support the combination of network slices.

As shown in FIG. 1E, and by reference number 180, configuration gateway device 115 may receive a validation request to validate particular configuration parameters. For example, configuration gateway device 115 may receive the validation request from a single pane of glass (SPOG) system, from run-time service orchestrator device 110 via the SPOG system, from the device of the network administrator, among other examples. The particular configuration parameters may include a configuration parameter value that has been manually modified (e.g., by the device of the network administrator) and a configuration parameter key of the configuration parameters, as determined in connection with FIG. 1D. Additionally, or alternatively, the particular configuration parameters may include an additional configuration parameter key and a corresponding configuration parameter value that have been manually created in addition to the configuration parameters determined in FIG. 1D.

In some implementations, the validation request may include information indicating that the configuration parameter value has been modified and/or information indicating that the additional configuration parameter key and the corresponding configuration parameter value have been created. The validation request may further include information included in the NF configuration information, such as the first network slice information, the second network slice information, the available resource information, among other examples.

Additionally, or alternatively, the validation request may include information regarding loads associated with the network slices (e.g., information regarding a load associated with the first network slice and/or information regarding a load associated with the second network slice), information regarding usage of resources by the network slices (e.g., information regarding usage of resources by the first network slice and/or information regarding usage of resources by the second network slice), and/or the configuration parameters determined for the combination of network slices.

As shown in FIG. 1E, and by reference number 185, configuration gateway device 115 may perform the validation of the particular configuration parameters. For example, configuration gateway device 115 may perform the validation, of the particular configuration parameters, to determine whether the NF instance is able to continue to support the combination of network slices, support a different combination of network slices, and/or support individual network slices.

Configuration gateway device 115 (e.g., using slice configuration validation automation component 125) may perform the validation using the first network slice information, the second network slice information, the available resource information, the information regarding the loads associated with the network slices, the information regarding usages of resources by the network slices, and/or the configuration parameters determined for the combination of network slices.

In some implementations, configuration gateway device 115 may perform the validation using one or more rules that validate a modification or a creation of configuration parameters, in a manner similar to the manner described above in connection with FIG. 1D. In some implementations, configuration gateway device 115 may perform the validation using a machine learning model that is trained to validate a modification or a creation of configuration parameters, in a manner similar to the manner described above in connection with FIG. 1D.

As shown in FIG. 1E, and by reference number 190, configuration gateway device 115 may provide a result of the validation. For example, configuration gateway device 115 may provide the result of the validation to the SPOG system, to run-time service orchestrator device 110, to the device of the network administrator, among other examples. In some situations, the result of the validation may indicate that the particular configuration parameters passed the validation. Alternatively, the result of the validation may indicate that the particular configuration parameters failed the validation.

With respect to failing the validation, the result may include information identifying slice requirements (or objectives) (e.g., of one or more network slices supported by the NF instance) that were not satisfied. The information identifying the slice requirements may identify a set of configuration parameter keys that govern the slice requirements. In some implementations, the set of configuration parameter keys may be manually defined. Alternatively, the set of configuration parameter keys may be determined by automation, as described herein.

By determining the configuration parameters as described herein, the network device may preserve computing resources, network resources, and other resources that would have been consumed by manually determining the configuration parameters for the numerous combinations of network slices.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
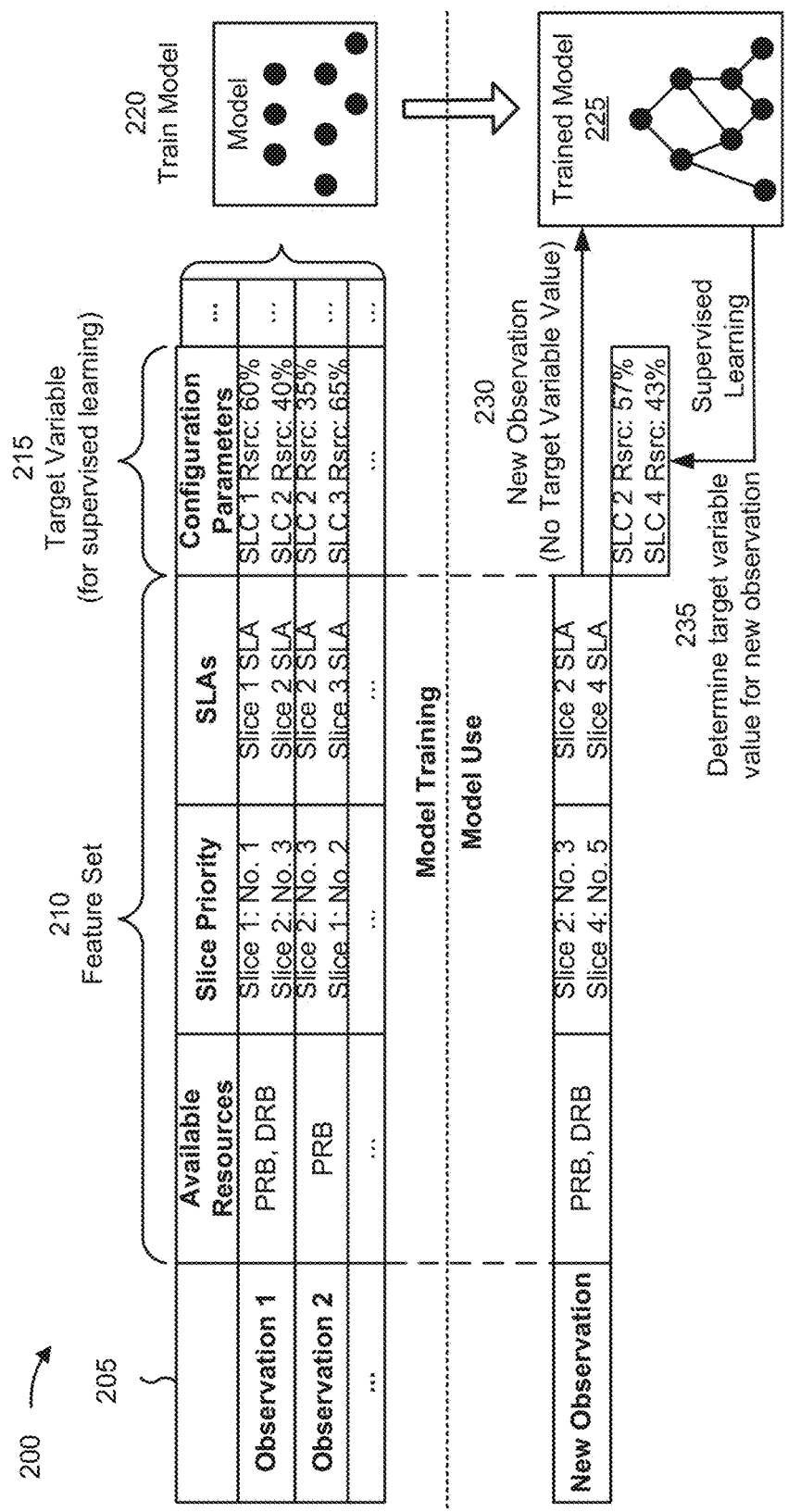
FIG. 2 is a diagram illustrating an example of training and using a machine learning model in connection with automating network slice configuration.

FIG. 2 is a diagram illustrating an example 200 of training and using a machine learning model in connection with automating network slice configuration. The machine learning model training and usage described herein may be performed using a machine learning system. The machine learning system may include or may be included in a computing device, a server, a cloud computing environment, or the like, such as the configuration gateway device 115 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from configuration gateway device 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from configuration gateway device 115. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of available resources, a second feature of slice priority, a third feature of service level agreements (SLAs), and so on. As shown, for a first observation, the first feature may have a value of PRB, DRB, the second feature may have a value of Slice 1: No. 1 and Slice 2: No. 3, the third feature may have a value of Slice 1 SLA and Slice 2 SLA, and so on. These features and feature values are provided as examples, and may differ in other examples. For example, the feature set may include one or more of the following features: NF type, active network slices, set of configuration parameters.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is configuration parameters, which has a value of SLC 1 Rsrc: 60% and SLC 2 Rsrc: 40% for the first observation.

The feature set and target variable described above are provided as examples, and other examples may differ from what is described above. For example, for a target variable of validation, the feature set may include available resources, slice priority, SLAs, NF type, active network slices, and/or set of configuration parameters.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of PRB, DRB, a second feature of Slice 2: No. 3 and Slice 4: No. 5, a third feature of Slice 1 SLA and Slice 2 SLA, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of SLC 2 Rsrc: 57% and SLC 4 Rsrc: 43% for the target variable of Configuration Parameters for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, allocate resources to network slices based on the configuration parameters. The first automated action may include, for example, allocating resources to network slices based on the configuration parameters.

As another example, if the machine learning system were to predict a value of fail for the target variable of configuration parameter validation, then the machine learning system may provide a second (e.g., different) recommendation (e.g., provide information identifying slice requirements not satisfied) and/or may perform or cause performance of a second (e.g., different) automated action (e.g., providing information identifying slice requirements not satisfied).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to automating network slice configuration. The machine learning system enables recognition and/or identification of tens, hundreds, thousands, or millions of features and/or feature values for tens, hundreds, thousands, or millions of observations, thereby increasing accuracy and consistency and reducing delay associated with automating network slice configuration relative to requiring computing resources to be allocated for tens, hundreds, or thousands of operators to manually automating network slice configuration using the features or feature values.

As indicated above, FIG. 2 is provided as an example. Other examples may differ from what is described in connection with FIG. 2.

Figure 3:
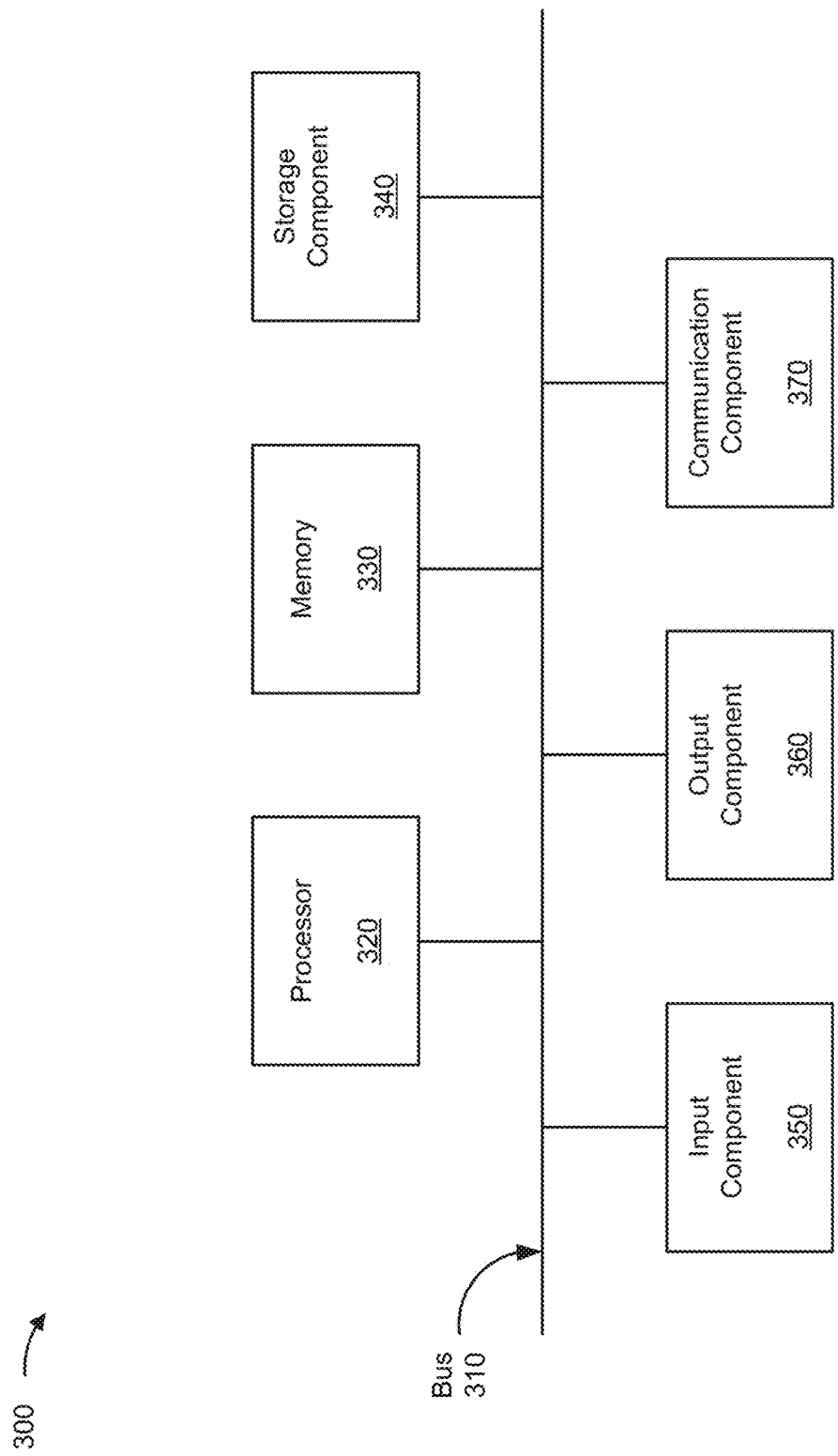
FIG. 3 is a diagram of example components of a device, which may correspond to one or more devices in FIG. 1.

FIG. 3 is a diagram of example components of a device 300, which may correspond to one or more devices in FIG. 1. The devices may include configuration gateway device 115, slice design creation device 105, run-time service orchestrator device 110, and/or configuration data structure 140. In some implementations, configuration gateway device 115, slice design creation device 105, run-time service orchestrator device 110, and/or configuration data structure 140 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with automating network slice configuration. In some implementations, one or more process blocks of FIG. 4 may be performed by a first device (e.g., configuration gateway device 115). In some implementations, one or more process blocks of FIG. 4 may be performed by another device or a group of devices separate from or including the first device, such as slice design creation device 105 (e.g., slice design creation device 105), run-time service orchestrator device 110 (e.g., run-time service orchestrator device 110), and/or configuration data structure 140 (e.g., configuration data structure 140). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a second device, information indicating that a network function (NF) instance is to be provisioned to support a combination of network slices that includes a first network slice and a second network slice (block 410). For example, the first device may receive, from a second device, information indicating that an NF instance is to be provisioned to support a combination of network slices that includes a first network slice and a second network slice, as described above.

As further shown in FIG. 4, process 400 may include receiving, from the second device, first network slice information regarding the first network slice and second network slice information regarding the second network slice (block 420). For example, the first device may receive, from the second device, first network slice information regarding the first network slice and second network slice information regarding the second network slice, as described above.

In some implementations, receiving the first network slice information comprises receiving service level agreement information associated with the first network slice, an inter-slice priority level associated with the first network slice, and information identifying the first network slice as an active network slice in the combination of network slices.

In some implementations, receiving the second network slice information comprises receiving service level agreement information associated with the second network slice, an inter-slice priority level associated with the second network slice, and information identifying the second network slice as an active network slice in the combination of network slices.

As further shown in FIG. 4, process 400 may include obtaining, from a data structure, first slice configuration information associated with the NF instance supporting the first network slice and second slice configuration information associated with the NF instance supporting the second network slice (block 430). For example, the first device may obtain, from a data structure, first slice configuration information associated with the NF instance supporting the first network slice and second slice configuration information associated with the NF instance supporting the second network slice, as described above.

As further shown in FIG. 4, process 400 may include generating configuration parameters to provision the NF instance to support the combination of network slices (block 440). For example, the first device may generate configuration parameters to provision the NF instance to support the combination of network slices, wherein the configuration parameters are generated based on the first network slice information, the second network slice information, the first slice configuration information, and the second slice configuration information, as described above. In some implementations, the configuration parameters are generated based on the first network slice information, the second network slice information, the first slice configuration information, and the second slice configuration information.

In some implementations, process 400 includes receiving available resource information regarding available resources associated with the NF instance, and generating the configuration parameters comprises generating the configuration parameters further based on the available resource information.

In some implementations, process 400 includes receiving information identifying a subset of a plurality of configuration parameters associated with the NF instance, and generating the configuration parameters comprises generating the configuration parameters further based on the information identifying the subset of the plurality of configuration parameters.

In some implementations, generating the configuration parameters comprises generating configuration parameter values associated with configuration parameter keys, wherein the configuration parameter keys and the configuration parameter values identify a manner in which resources, controlled by the NF instance, are to be used to meet requirements associated with the combination of network slices.

As further shown in FIG. 4, process 400 may include providing the configuration parameters to cause the NF instance to be provisioned to support the combination of network slices (block 450). For example, the first device may provide the configuration parameters to cause the NF instance to be provisioned to support the combination of network slices, as described above.

In some implementations, the configuration parameters include configuration parameter keys and configuration parameter values associated with the configuration parameter keys, and process 400 includes receiving information indicating that a configuration parameter value of a configuration parameter value, of the configuration parameters, has been modified, and performing a validation, based on the configuration parameter key and the configuration parameter value, to determine whether the NF instance is able to continue to support the combination of network slices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a first device, comprising:
receiving, from a second device, information indicating that a network function (NF) instance is to be provisioned to support a combination of network slices that includes a first network slice and a second network slice,
wherein the information includes available resource information that includes information regarding data radio bearers and information regarding physical resource blocks;
receiving, from the second device, first network slice information regarding the first network slice and second network slice information regarding the second network slice,
wherein the first network slice information includes first priority information identifying a first inter-slice priority level associated with the first network slice, and wherein the second network slice information includes second priority information identifying a second inter-slice priority level associated with the second network slice;
generating configuration parameters to provision the NF instance to support the combination of network slices,
wherein the configuration parameters are generated based on the available resource information, the first network slice information, and the second network slice information, and
wherein the configuration parameters include information identifying a manner in which resources, identified by the available resource information, are to be allocated between the first network slice the second network slice based on the first inter-slice priority level and the second inter-slice priority level; and
providing the configuration parameters to cause the NF instance to be provisioned to support the combination of network slices.

2. The method of claim 1, further comprising:
obtaining first slice configuration information associated with the NF instance supporting the first network slice and second slice configuration information associated with the NF instance supporting the second network slice; and
wherein generating the configuration parameters comprises:
generating the configuration parameters further based on the first slice configuration information and the second slice configuration information.

3. The method of claim 1, further comprising:
receiving information identifying a subset of a plurality of configuration parameters associated with the NF instance; and
wherein generating the configuration parameters comprises:
generating the configuration parameters further based on the information identifying the subset of the plurality of configuration parameters.

4. The method of claim 1, wherein generating the configuration parameters comprises:
generating configuration parameter values associated with configuration parameter keys,
wherein the configuration parameter keys and the configuration parameter values identify a manner in which resources, controlled by the NF instance, are to be used to meet requirements associated with the combination of network slices.

5. The method of claim 1, wherein receiving the first network slice information comprises:
receiving service level agreement information associated with the first network slice and information identifying the first network slice as an active network slice in the combination of network slices.

6. The method of claim 1, wherein receiving the second network slice information comprises:
receiving service level agreement information associated with the second network slice and information identifying the second network slice as an active network slice in the combination of network slices.

7. The method of claim 1, wherein the configuration parameters include configuration parameter keys and configuration parameter values associated with the configuration parameter keys; and
wherein the method further comprises:
receiving information indicating that a configuration parameter value of a configuration parameter value, of the configuration parameters, has been modified; and
performing a validation, based on the configuration parameter key and the configuration parameter value, to determine whether the NF instance is able to continue to support the combination of network slices.

8. A first device, comprising:
one or more processors configured to:
receive, from a second device, network function (NF) configuration information indicating that an NF instance is to be provisioned to support different combinations of network slices,
wherein the network slices include a first network slice and a second network slice,
wherein the NF configuration information includes first network slice information regarding the first network slice, second network slice information regarding the second network slice, and available resource information regarding resources that include data radio bearers and physical resource blocks, and wherein the first network slice information identifies a first priority associated with the first network slice and wherein the second network slice information identifies a second priority associated with the second network slice;

generate a plurality of sets of configuration parameters to provision the NF instance to support the different combinations of network slices, wherein a set of configuration parameters, of the plurality of sets of configuration parameters, is generated based on the NF configuration information, the first network slice information, and the second network slice information, and wherein the set of configuration parameters includes information identifying a manner in which the resources, associated with the NF instance, are to be allocated between the first network slice and the second network based on the first priority and the second priority; and cause the set of configuration parameters to be stored in a data structure, wherein the data structure stores information for provisioning NF instances to support network slices.

9. The first device of claim 8, wherein the one or more processors are further configured to:

receive a validation request to perform a validation of a configuration parameter key and a configuration parameter value associated with the combination of network slices; and perform the validation, based on the configuration parameter key and the configuration parameter value, to determine whether the NF instance is able to continue to support the combination of network slices.

10. The first device of claim 9, wherein the one or more processors, to receive the validation request, are configured to receive at least one of:

information identifying a priority associated with the network slices, information regarding service level agreements of the network slices, information regarding loads associated with the network slices, information regarding usage of resources by the network slices, or information identifying an availability of the resources.

11. The first device of claim 8, wherein the set of configuration parameters further includes subcarrier information identifying a first subcarrier spacing associated with the first network slice and identifying a second subcarrier spacing associated with the second network slice.

12. The first device of claim 8, wherein the available resource information includes information regarding the data radio bearers, information regarding the physical resource blocks, information identifying a quantity of data radio bearers, information identifying a quantity of physical resource blocks, and information identifying an amount of carrier bandwidth, and wherein the configuration parameters indicate that a first portion of the resources allocated to the first network slice exceeds second portion of the resources allocated to the second network slice based on the first priority exceeding the second priority.

13. The first device of claim 8, wherein the one or more processors, to receive the NF configuration information, are configured to:

receive information identifying a type of the NF instance.

14. The first device of claim 8, wherein the one or more processors, to receive the NF configuration information, are configured to:

receive first environment information identifying a first environment associated with the first network slice; and receive second environment information identifying a second environment associated with the second network slice.

15. A non-transitory computer-readable medium storing a set of instructions, the set of instructions comprising:

one or more instructions that, when executed by one or more processors of a first device, cause the device to:

receive, from a second device, network function (NF) configuration information indicating that an NF instance is to be provisioned to support a combination of network slices, wherein the network slices include a first network slice and a second network slice, and where the NF configuration information includes first network slice information regarding the first network slice, second network slice information regarding the second network slice, and available resource information regarding resources that include at least one of a data radio bearer or a physical resource block, and wherein the first network slice information identifies a first priority associated with the first network slice and wherein the second network slice information identifies a second priority associated with the second network slice;

generate configuration parameters to provision the NF instance to support the combination of network slices, wherein the configuration parameters are generated based on the NF configuration information, the first network slice information, and the second network slice information, and wherein the configuration parameters include information identifying a manner in which the resources are to be allocated between the first network slice and the second network slice based on the first priority and the second priority; and provide the configuration parameters to cause the NF instance to be provisioned to support the combination of network slices.

16. The non-transitory computer-readable medium of claim 15, wherein the one or more instructions, when executed by the one or more processors, further cause the first device to:

receive a validation request to perform a validation of a configuration parameter key and a configuration parameter value associated with the combination of network slices; and perform the validation, based on the configuration parameter key and the configuration parameter value, to determine whether the NF instance is able to continue to support the combination of network slices.

17. The non-transitory computer-readable medium of claim 16, wherein the one or more instructions, that cause the first device to receive the validation request, cause the first device to receive at least one of:

information identifying priorities associated with the network slices, information regarding service level agreements of the network slices, information regarding loads associated with the network slices, information regarding usage of resources by the network slices, or information identifying an availability of the resources.

18. The non-transitory computer-readable medium of claim 15, wherein the one or more instructions, that cause the first device to receive the NF configuration information, cause the first device to:

receive information identifying a type of the NF instance.

19. The non-transitory computer-readable medium of claim 15, wherein the one or more instructions, that cause the first device to receive the NF configuration information, cause the first device to:

receive information identifying a subset of a plurality of configuration parameters associated with the NF instance; and wherein the one or more instructions, that cause the first device to generate configuration parameters, cause the first device to:

generate the configuration parameters based on the information identifying the subset of the plurality of configuration parameters.

20. The non-transitory computer-readable medium of claim 15, wherein the configuration parameters are generated based on the NF configuration information, the first slice configuration information, and the second slice configuration information, wherein the one or more instructions, that cause the first device to receive the NF configuration information, cause the first device to:

receive first environment information identifying a first environment associated with the first network slice, and receive second environment information identifying a second environment associated with the second network slice; and wherein the one or more instructions, that cause the first device to generate configuration parameters, cause the first device to:

generate the configuration parameters further based on the first environment information and the second environment information.

\* \* \* \* \*